(12) United States Patent
Rahamin

(10) Patent No.: US 10,994,305 B2
(45) Date of Patent: May 4, 2021

(54) DEVICES AND METHODS FOR SIFTING

(71) Applicant: David Lee Rahamin, North Miami, FL (US)

(72) Inventor: David Lee Rahamin, North Miami, FL (US)

( * ) Notice: Subject to any disclaimer, the term of this patent is extended or adjusted under 35 U.S.C. 154(b) by 200 days.

(21) Appl. No.: 16/269,101

(22) Filed: Feb. 6, 2019

(65) Prior Publication Data

US 2019/0240699 A1 Aug. 8, 2019

Related U.S. Application Data

(60) Provisional application No. 62/627,257, filed on Feb. 7, 2019.

(51) Int. Cl.
*B07B 15/00* (2006.01)
*B07B 1/28* (2006.01)
*B02C 9/04* (2006.01)
*B07B 1/46* (2006.01)
*G07F 17/00* (2006.01)

(52) U.S. Cl.
CPC .................. *B07B 1/28* (2013.01); *B02C 9/04* (2013.01); *B07B 1/46* (2013.01); *B07B 15/00* (2013.01); *G07F 17/0064* (2013.01); *A23V 2002/00* (2013.01); *B07B 2201/04* (2013.01)

(58) Field of Classification Search
CPC ........... B07B 1/52; B07B 1/524; B07B 1/528; B07B 13/16; B07B 15/00; A47J 43/04; A47J 43/22; G01F 11/24; B02C 9/04
See application file for complete search history.

(56) References Cited

U.S. PATENT DOCUMENTS

| | | | | |
|---|---|---|---|---|
| 4,136,022 A | * | 1/1979 | Hutzler ................... | B07B 1/528 206/515 |
| 4,322,017 A | * | 3/1982 | Lowdermilk ........... | G01F 11/24 222/217 |
| 4,392,591 A | * | 7/1983 | Fassauer ................ | B65D 88/68 222/227 |
| 4,560,092 A | * | 12/1985 | Souza ..................... | G01F 11/24 220/23.4 |
| 4,793,525 A | * | 12/1988 | Kaufmann ............... | B01J 8/002 222/333 |
| 5,495,962 A | * | 3/1996 | Nomura ................. | A47G 19/34 222/240 |

(Continued)

*Primary Examiner* — Joseph C Rodriguez
(74) *Attorney, Agent, or Firm* — The Plus IP Firm; Derek Fahey

(57) ABSTRACT

A sifting device having an upper chamber and a lower chamber. An upper chamber offset opening is disposed on the end wall of the upper chamber and offset from a central axis. A shaft rotates about the central axis of the upper chamber. A blade in the upper chamber and attached with the shaft. The blade is configured to rotate between an open position and a closed position. A cone element is disposed on the blade and concentric with the upper chamber. A lower sifting element is disposed within the lower chamber. The shaft attached with the lower sifting element such that the lower sifting element rotates in the lower chamber when the shaft rotates. The upper chamber offset opening is configured to allow powdered substance to move from the upper chamber to the lower chamber so that the blade and lower sifting element can sift powdered substances.

14 Claims, 8 Drawing Sheets

(56) References Cited

U.S. PATENT DOCUMENTS

| | | | | |
|---|---|---|---|---|
| 5,622,467 A * | 4/1997 | Pethullis | ............ | B65G 65/4836 |
| | | | | 222/410 |
| 8,104,645 B2 * | 1/2012 | Momsen | ............ | B65G 65/4836 |
| | | | | 222/239 |
| 9,051,091 B2 * | 6/2015 | Webster | ................. | B65D 83/06 |
| 9,364,118 B2 * | 6/2016 | Henry | .................... | A47J 43/22 |
| 9,655,474 B2 * | 5/2017 | Beber | ................. | A47J 43/0705 |

* cited by examiner

DEVICES AND METHODS FOR SIFTING

CROSS-REFERENCE TO RELATED APPLICATIONS

This application claims the benefit of the filing date of U.S. Provisional Application Ser. No. 62/627,257 titled "VENDING MACHINE FOR COOKING AND DISPENSING FOOD" and filed Feb. 7, 2018 and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of vending machines.

BACKGROUND

People all around the world have enjoyed fresh hot food for thousands of years. Vending machines have been one way to provide food to people. The earliest known to vending machine dates to first century Roman Egypt. The vending machine accepted a calling to dispense holy water. When the coin was deposited, it fell upon a pan attached to a lever. The lever opened a valve which let some water flow out. The pan continued to tilt with the weight of the coin until it fell off, at which point a counterweight snapped the lever up and turned off the valve.

The first modern coin-operated vending machines were introduced in London in the late 1880s. Various types of food and snack vending machines exist in the world. Typically, food vending machines provide shelf stable foods such as chips, cookies and cakes and other snacks. Some vending machines have been used to make hot foods such as pizzas.

One of the major problems with vending machines that make hot foods is the cleanliness of machines. More specifically, one of the issues with food related or pizza vending machines is that the flour cannot be sifted correctly which is key for making fresh, tasty pizza. Without having flour being sifted before making pizza and other fresh oven cooked food, the food is not tasty.

Another major problem associated with sifting flour is that in many jurisdictions regulations exist that bags of flour cannot be stored on the machine. Additionally, another major problem with vending machines related to cooking food or materials is that the size of machine necessary to cook food. Additionally, another major problem with vending machines is the inability of the machine to dispense the necessary toppings or condiments that people use, such as salt, pepper, garlic powder, red pepper flakes etc.

As a result, there exists a need for improvements over the prior art and more particularly for a more efficient way of providing a machine capable of dispensing food in a better way to automate sifting flour that is suitable for the vending machine.

SUMMARY

A vending machine for cooking and dispensing food is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a sifting device is disclosed. The sifting device includes a main body having an upper end, a lower end, an upper chamber at the upper end and a lower chamber at the lower end. The upper chamber has a side wall, an end wall and a mouth. An upper chamber central opening is disposed on the end wall of the upper chamber concentric with the upper chamber. An upper chamber offset opening is on the end wall of the upper chamber and offset from a central axis of the upper chamber. A rotatable shaft that rotates about the central axis of the upper chamber is disposed in the upper chamber central opening. A blade is disposed just above the end wall and in attachment with the rotatable shaft such that the blade rotates when the rotatable shaft rotates. The blade is configured to rotate between an open position and a closed position. In the open position the blade does not cover the upper chamber offset opening. In the closed position the blade covers the upper chamber offset opening. A cone element is disposed on the blade and concentric with the upper chamber. A lower sifting element is disposed within the lower chamber. The lower sifting element has radially extending teeth and a lower sifting element central opening that is concentric with the lower chamber. The rotating shaft is disposed within the lower sifting element central opening and is in attachment with the lower sifting element such that the lower sifting element rotates in the lower chamber when the rotatable shaft rotates. The upper chamber offset opening is configured to allow powdered substance to move from the upper chamber to the lower chamber.

In another embodiment, an object dispensing device is disclosed, the object dispensing element includes a vertical rack having a closed bottom end and an open to top end, the top end for receiving boxes. At least one vertical orientated spacer defining a plurality of vertical compartments is within each vertical compartment for housing a vertical stack of objects. An opening is at a front side of a lower end of each vertical compartment and is configured for allowing objects to be dispensed out of the front side of the rack. A sensor at the lower end of each vertical compartment is for detecting objects within each vertical compartment. A box mover is positioned at the lower end of each vertical compartment. The box mover is configured to translate forwards and backwards in the rack so that the box mover pushes the lowest object in the vertical stack out of the opening of each compartment. The object dispensing device also includes a motor providing rotational force, a crank and connecting rod coupled to the motor and the box mover. The crank and connecting rod convert the rotational force provided by the motor to linear force so the box mover can translate frontwards and backwards in the rack.

In another embodiment, a vending machine for dispensing cooked food is disclosed. The vending machine comprises: a) a sifting device for sifting flour; b) a dough forming means for forming dough out of ingredients; c) a pie crust forming means for pressing dough to form a pie crust; d) a sauce dispensing means for dispensing toppings on the pie crust, wherein the sauce dispensing means includes a rotating sauce dispenser for dispensing sauce on the pie crust; e) a topping dispensing apparatus for dispensing a plurality of toppings on the pie crust at a topping dispensing area; f) a cooking means for cooking the toppings and pie crust; g) a package forming means for forming a carrying device, such as tray or box, to hold the cooked pizza; h) a dynamic robotic arm for moving the pie crust in the x axis, y axis and z axis directions through the vending machine between pie crust forming means, below the sauce dispenser, the oven, box forming means, receiving tray zone and final dispensing area, and for moving the carrying device between a box forming means drop zone and the pizza receiving tray zone and final dispensing area; and, i) a box dispensing device.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
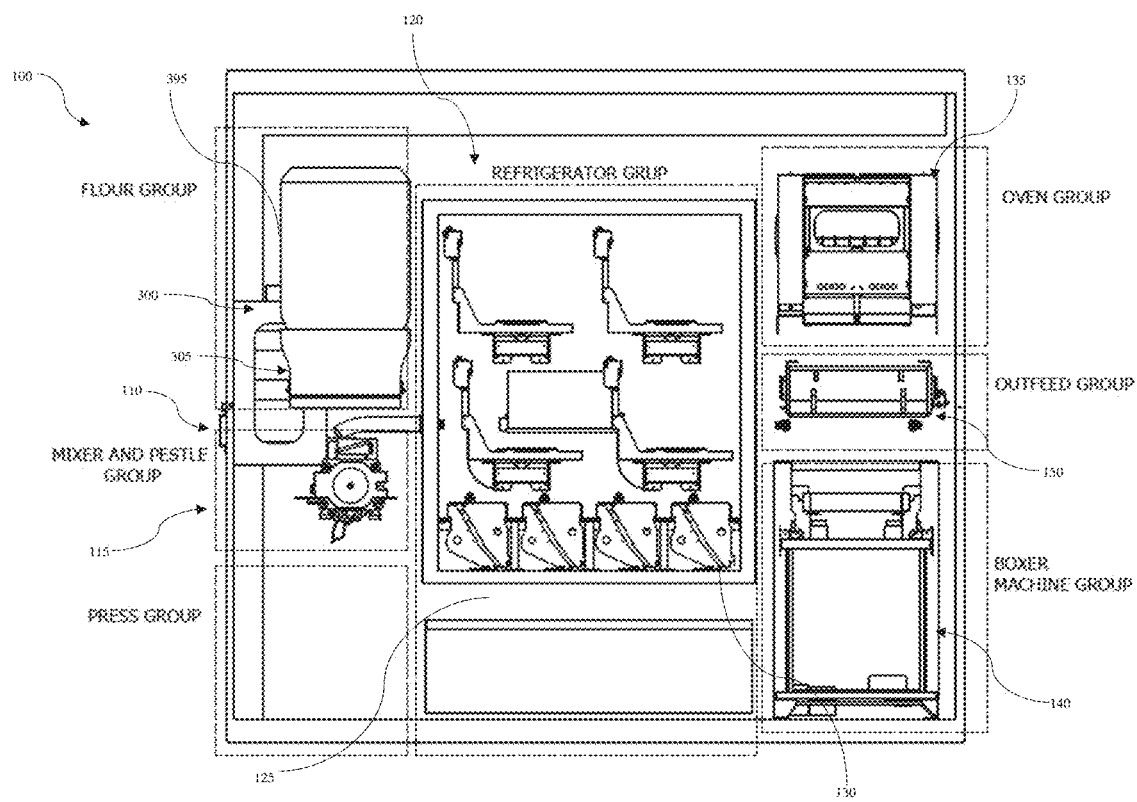
FIG. 1 is an illustration of main components and systems of the vending machine, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a vending machine for cooking and dispensing food. The sifting device is an improvement as the sifting device provides a refillable, efficient, automatic apparatus to sift powdered substances. The device is also the improvement of the prior art because it allows for vending machine owners to use refillable cartridges that are used for making fresh pizzas. The system improves over the prior art by also providing users with blades and other rotating objects instead of screens or other devices for sifting, which makes the device easier to clean. Using a screen sifter for sifting in vending machines is impractical because screen sifters are difficult to clean. The system also improves over the prior by providing a much easier to clean vending machine given the fact that no screens are used for sifting.

Figure 2:
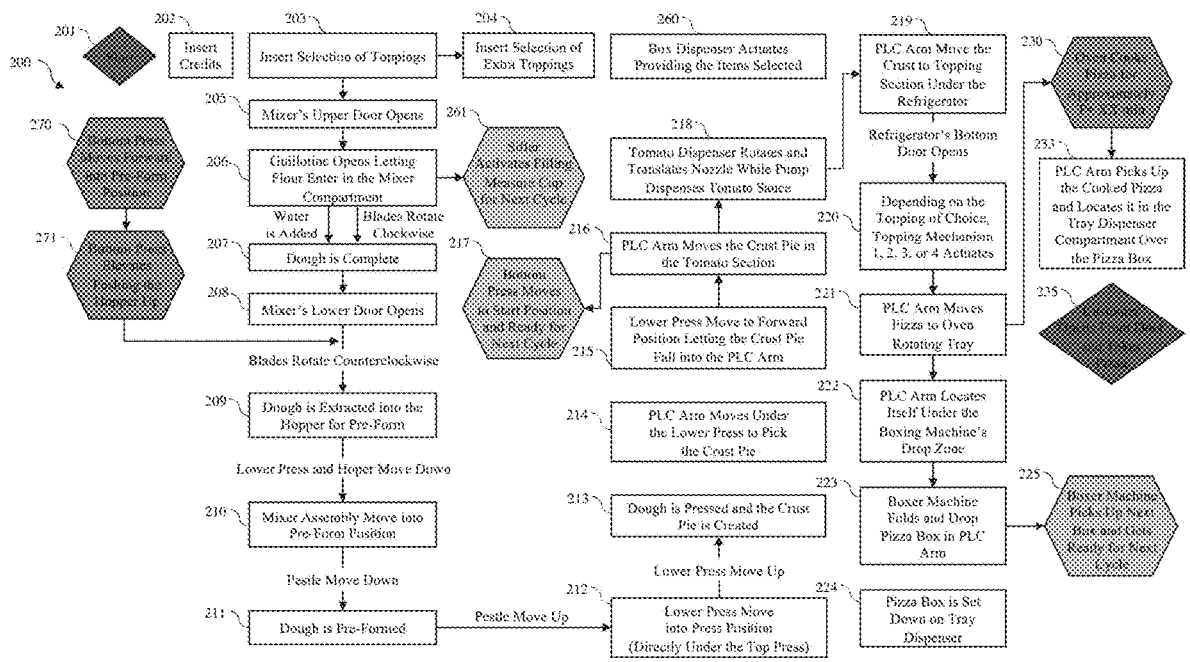
FIG. 2 is a process flow chart of the process flow for the vending machine, according to an example embodiment.
Figure 3:
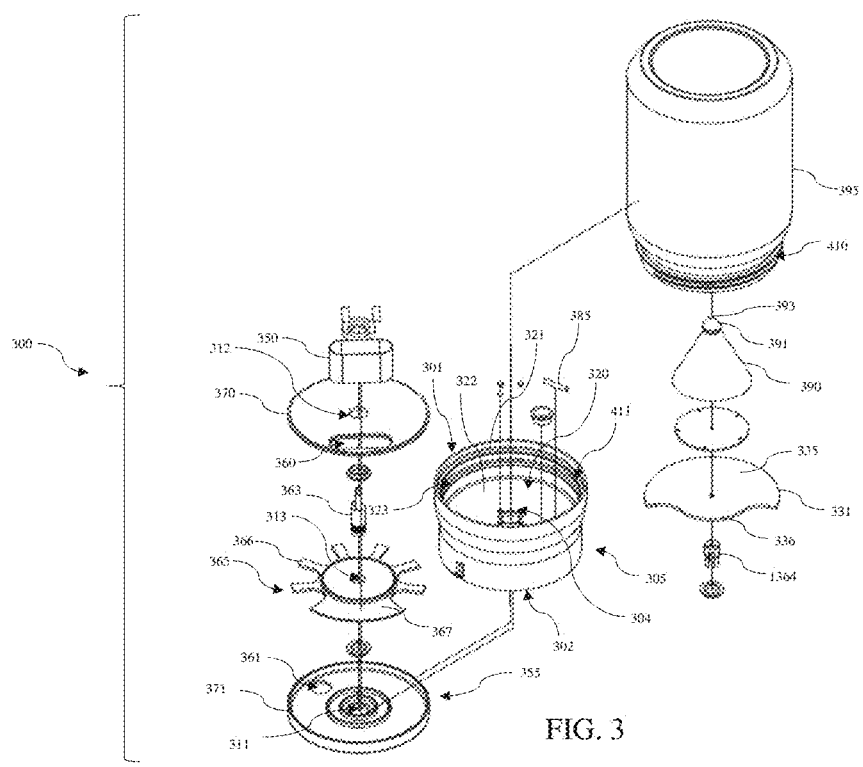
FIG. 3 is an exploded perspective view of an illustration of the sifting device, according to an example embodiment.

Referring now to the Figures, FIG. 1 is an illustration of main components and systems of the vending machine 100, according to an example embodiment. FIG. 2 is a process flow chart 200 of the process flow for the vending machine, according to an example embodiment. The vending machine for dispensing cooked food has a) a sifting device 300 for sifting flour (further explained below and illustrated in FIGS. 3-5B); b) a dough forming means for forming dough out of ingredients; c) a pie crust forming means for pressing dough to form a pie crust; d) a sauce dispensing means for dispensing sauce on the pie crust, wherein the sauce dispensing means includes a rotating sauce dispenser for dispensing sauce on the pie crust; e) a refrigeration element for refrigeration of toppings and sauce, the refrigeration element for housing a topping dispensing apparatus; f) a topping dispensing apparatus for dispensing a plurality of toppings on the pie crust at a topping dispensing area; g) a cooking means for cooking the toppings and pie crust; h) a package forming means for forming a carrying device, such as tray or box, to hold the cooked pizza; i) a dynamic robotic arm for moving the pie crust in the x axis, y axis and z axis directions through the vending machine between pie crust forming means, below the sauce dispenser, the oven, box forming means, receiving tray zone and final dispensing area, and for moving the carrying device between a box forming means drop zone and the pizza receiving tray zone and final dispensing area; and, j) a box dispensing device.

FIGS. 1 and 2 will be discussed together. When a consumer desires a pizza, the process starts (step 201). To purchase the cooked food or pizza the consumer enters credits (tokens, money, credit card, or debit card payment) into the money receiving area. Next, in step 203 the consumer selects the toppings he or she desires via a user interface on the face of the device. Additionally, the user may also insert credits to select extra toppings via the user interface. The flour group 105 includes a removable cartridge 395 having flour or powdered substance that is attached on top the sifting device 300. The sifting device 300 sifts the flour so that the sifted flour may move into the mixer and pestle group 110.

FIGS. 3-5B depict components of the sifting device 300. FIGS. 3-5B will be discussed together. Individual figures will be pointed out where components may be more easily seen in one figure versus another figure. The sifting device has a main body 305 having an upper end 301, a lower end 302, an upper chamber 320 at the upper end and a lower chamber 321 at the lower end. The sifting device is for sifting powdered substances such as flour. In the present embodiment, the sifting device is positioned on the leftward side of the vending machine. However, in other embodiments, other positions may be used.

In the embodiment shown, the main body 305 is a cylindrical shaped body. However, any shape is within the scope of the invention as long as the main body is configured to receive a cartridge 395 having flour or other powdered substances. In the present embodiment, the upper end is a slighter larger cross-sectional diameter than the lower end.

The upper chamber has a side wall 321 an end wall 332 and a mouth 323. In the present embodiments, the upper chamber is substantially cylindrical in shape. The sidewalls of the upper chamber are threaded or has a threaded portion 411 that is configured to match threads 410 on the bottom end of the cartridge 395. The cartridge is configured to be removably attachable with the upper chamber. Before the cartridge is attached to the upper end of the main body, the cartridge may be hermetically sealed so that how the flour remains fresh. Additionally, when the cartridge is attached in the fully assembled configuration and the blade or first sifting element is in the closed configuration, the flour or powdered substance is only exposed to a very small amount of air thereby keeping the flour or powdered substance fresh. After a period of time or when the cartridge no longer has flour or powdered substance, an operator may remove the cartridge to replace it with another cartridge that has fresh flour or powdered substance.

Figure 4:
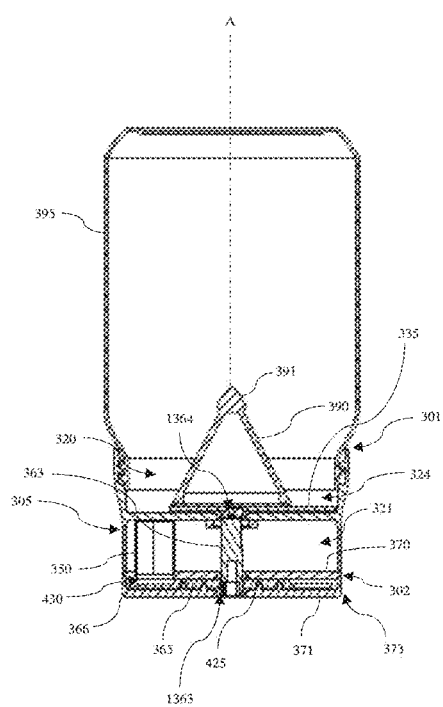
FIG. 4 is a cross-sectional side view of an illustration of the sifting device in the fully assembled configuration, according to an example embodiment.
Figure 5A:
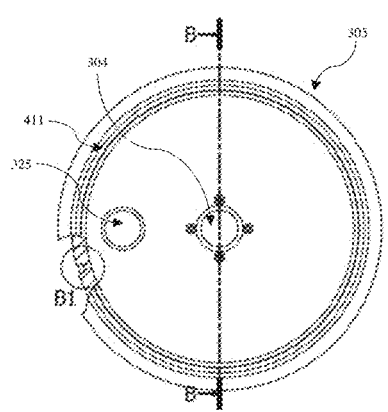
FIG. 5A is a top view of the main body of the sifting device illustrating an upper chamber, according to an example embodiment.
Figure 5B:
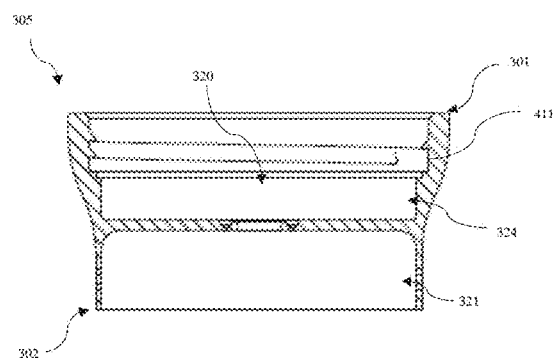
FIG. 5B is a side cross-sectional view of the main body of the sifting device taken along line B in FIG. 5A illustrating the upper and lower chambers, according to an example embodiment.

When in the fully assembled configuration (as illustrated in FIG. 4) the cartridge is attached to the upper and of the main body such that the threaded portion 410 of the lower end of the cartridge is attached to the threaded portion 411 of the sidewalls of the chamber. When the cartridge is attached to the upper end of the main body, a space 324 is defined below the lower end of the cartridge within the chamber. The space 324 is where the powdered substance may be first sifted by the sifting device.

The upper chamber has an upper chamber central opening on the end wall of the upper chamber, wherein the upper chamber central opening 304 is concentric with the central axis of the upper chamber and main body. The longitudinal axis or central axis of the main body and upper chamber is represented by hashed line A (as illustrated in FIG. 4). The central opening is configured for having a rotatable shaft 363 disposed within the central opening, with the further explained below. The upper chamber also has an upper chamber offset opening 325 on the end wall of the upper chamber. The upper chamber offset opening is offset from the central axis of the upper chamber and main body. The offset opening is configured for allowing powdered substance to pass out of the upper chamber after the flour has been sifted by the blade or upper sifting device 335, which will be further explained below.

A rotatable shaft 363 is disposed in the center of the main body and is configured to pass through both the upper chamber and lower chamber of the main body. The lower end 1363 of the rotatable shaft is configured to be engaged with a device that is configured to rotate and powered by a motor. The upper end 1364 of the rotatable shaft is in attachment with the blade or first sifting device 335 such that the blade rotates when the rotatable shaft rotates. The rotatable shaft may comprise multiple pieces or maybe actually a single piece that extends from the upper chamber into the lower chamber. The rotatable shaft is an elongated shape object but can be any shape as long as the rotating element engages the upper sifting element and lower sifting element and is configured to be rotated by a device powered by a motor. However, many other embodiments may be used and are within the spirit and scope of the present invention. The rotatable shaft disposed in the upper chamber central opening and is configured to rotate about the central axis (represented by line A) of the main body. However, it is understood that other embodiments may be used and are within the spirit and scope of the present invention.

The blade or first sifting device 335 is disposed just above the end wall of the upper chamber. In the present embodiment, the blade or sifting device 335 is a substantially planar shaped object that is circular in shape having a cut out portion defining a cutting or sifting edge 336. For the present embodiment, the blade or first sifting device is shaped such that the non-cutting or non-sifting edge 331 abuts the sidewalls of the upper chamber (as illustrated in FIG. 4). As the rotatable shaft rotates within the central opening, the blade or first sifting device 335 also rotates such that the cutting-edge 336 of the blade sifts or cuts the flour or powdered substance before the flour or powdered substance enters the upper offset opening 325 and moves below the upper chamber. In operation, if the vending machine is not in operation, and sifting is not needed, the blade or upper sifting device will move into the closed configuration and block or cover the offset opening so that flour or powdered substance does not enter into the offset opening. When the blade or first sifting device rotates or turns clockwise and counterclockwise, the blade moves between an open configuration and the closed configuration. In the open configuration the blade does not cover the upper chamber offset opening 325. In the closed configuration, the blade covers the upper chamber offset opening.

A cone element 390 is disposed on the blade and concentric with the upper chamber. The cone element is a substantially conical shape body having a cylindrical shape base. However, it is understood that other shapes for the bases may be used that are within the spirit and scope of the present invention such as rectangular, polygon all, trapezoidal etc. The cone element may be triangular, dome shaped or any shape that disperses the powdered substance as it enters the chamber. The cone element is attached to the upper sifting element by fasteners and a washer in the embodiment shown but may be attached by other means. The base of the cone define an area that is less than the area of the blade. However, in other embodiments, the area defined by the blade may actually be less than the area of the base of the cone shaped element. At the top or point of the cone element is an apex bulb 391. The cone element is configured to interact with the flour and facilitate in breaking up the flour that is within the cartridge 395. The outer facing side walls of the cone shaped element pushes the flour to the area outward from the cone and into the space 324 below the cartridge and towards the cutting edge 336 of the blade or first sifting element. As the blade rotates, the cone may also rotate to facilitate breaking, moving or sifting flour.

Additionally, the sifting device may further include a protruding body 385 extending inward from the side wall of the upper chamber above the blade or first sifting device. In the present embodiment, the protruding body defines a substantially cylindrical shaped body. The protruding body is configured to be positioned within the space 324 below the threaded portion of the upper chamber and outward from the walls of the cone shaped element 390. The protruding body is configured for agitating powdered substance as it enters into the space from the lower end of the cartridge 395. The protruding element 395 also sifts, disperses and moves the powdered substance so that the powdered substance can reach the first sifting element and make and eventually pass through the offset opening 325.

The lower chamber has disposed within it a lower sifting element 365. The lower sifting element is a substantially planar shaped body and has a plurality of radially extending teeth 366 and a lower sifting element central opening 313 that is concentric with the lower chamber 321 when the lower sifting element is in the fully assembled configuration. The lower sifting element also has a non-teeth portion 367. When in the fully assembled configuration, the rotatable shaft is disposed within the lower sifting element central opening 313 and is in attachment with the lower sifting element such that the lower sifting element rotates below the upper chamber of the main body when the rotatable shaft rotates. The outward edge of each tooth and non-teeth portion are configured to be proximate to the sidewalls of the main body when the sifting device is in the fully assembled configuration. The upper chamber offset opening is configured to allow powdered substance to move from the upper chamber to the lower chamber such that the teeth of the lower sifting element engages the flour to sift the flour or powdered substance before the powdered substance leaves the main body and moves into the press group 115.

In one embodiment, lower sifting element 365 is disposed within a lower sifting element housing 373 and is in attachment with the lower chamber. The lower sifting element housing has an upper part 370 and a lower part 371 defining space therein where the lower sifting element 365 is to be positioned such that the lower sifting element may rotate within the lower sifting element housing when the sifting device is in the fully assembled configuration. The lower part 371 of the lower sifting element housing may also define ridges 425 that are configured to match grooves along the downward facing surface of the lower sifting element that assist in guiding the lower sifting element as the lower sifting element is rotated by the rotatable shaft. The upper part 370 of the lower sifting element housing may also define a central opening 312 and in offset opening 360. The central opening of the lower sifting element is co-centric with the lower chamber and is configured for having the rotatable shaft disposed therein when the sifting device is in the fully assembled configuration. In the present embodiment, the offset opening 360 of the upper part 370 is an elongated shaped oval opening. The lower part 371 of the lower sifting element housing also includes an offset opening 361 and a central opening 311. In operation, flour or powdered substance will enter into the offset opening 360 of the upper part 370, then be sifted by the teeth 366 as the teeth rotate, and an exit out of the opening 361 on the lower part of the lower sifting element.

In one embodiment, the tubular shaped conduit 350 spans from the upper chamber offset opening 325 to the lower sifting element housing upper opening 360. The tubular shaped conduit defines a channel from the upper chamber to inside the lower sifting element housing. The tubular shaped conduit directs the powdered substance or flour from the first chamber to the sifting parts or teeth of the lower sifting element.

In operation, a user will attach the cartridge 395 having its powdered substance within the cartridge to the upper end 301 of the main body 305 of the sifting device. As mentioned above, the cartridge may be hermetically sealed so that no air may leave or enter the cartridge. Before attaching the cartridge, a person may move the hermetically seal from the cartridge. The cartridge is hermetically sealed prior to being placed into the sifting device. The seal may be thermofoil. This ensures that no moisture, air or human touch can contaminate the powdered substance, which would compromise the powdered substance. Furthermore, this ensures that the cartridge containing food in powdered substance form can comply with regulations that require the cartridge to be hermetically sealed. The primary powdered substance described by this embodiment is flour used for making pizza dough. However, any powdered substance can be used that can be sifted and is well within the scope of this invention. The hermetical seal of the cartridge is broken before the cartridge is placed on the sifting device or the hermetical seal is broken by the sifting device as the cartridge is placed on the sifting device. An outward facing portion of the cartridge 395 is threated that engages the matching threaded portion on the interior wall of the main body 305 and the cartridge is screwed into the main body so that the cartridge securely attached to the upper chamber of the main body. Then gravity causes the powdered substance to exit the cartridge and enter the sifting device.

In operation, when the system is off or not sifting, the first sifting element 335 is in the closed configuration such that the body of the blade 335 covers the offset opening 325 of the end wall 322 of the first chamber. Next, a force is provided to the rotatable shaft 363 that is concentrically aligned with the sifting device thereby rotating the rotatable shaft. The force may be provided by the shaft of a motor or other device that is located within the vending machine. In other embodiments, force may be provided by the shaft of a motor or other device that is located outside of the vending machine. At the shaft 363 rotates, the first sifting element 335 is configured to rotate between an open configuration and closed configuration causing flour to be sifted by the cutting-edge 336 of the blade. As mentioned above, the apexed bulb 391 and the sidewalls of the cone shaped element 390 moves the flour outward into the space 324 below the cartridge. Additionally, the protruding shaped element 385 further helps the sifting of the powdered substance or flour within the space below where the cartridge is attached.

Next, the flour may move past the blade and into the offset opening 325 of the upper chamber and into the lower chamber through the offset chamber opening. In one embodiment, the as the powdered substance enters into the lower chamber, the teeth of the lower sifting element may sift the flour or powdered substance before the flour exits the lower end of the main body. In other embodiments, the method further includes moving through the tubular shaped conduit 350 powdered substance into a lower sifting element housing 373 that houses the lower sifting element therein. As mentioned above, the tubular shaped conduit 350 may provide a channel from the upper chamber and into the lower sifting element housing. One end of the tubular shaped conduit may be attached to the downward facing side of the upper channel and wall such that the offset opening 325 and upper opening of the conduit are aligned. Additionally, the lower end of the conduit may be aligned with the offset opening 360 of the upper part 370 of the lower sifting element housing. The force provided by the motor that rotates the rotating shaft may also rotate the lower sifting element. As the lower sifting element rotates, the teeth 366 are configured to further sift the flour or powdered substance that is entered into the lower sifting element housing because of the back and forth or rotational motion of the lower sifting element. As the flour or powdered substance is sifted, the sifted flour may move out of the opening 361 of the lower part of the lower sifting element housing. As the powdered substance then exits the sifting device through the opening 361, which provides sifted powdered substance to the user or machine. In the embodiment described where the powdered substance is flour, the sifted flour is now ready to be made into pizza dough.

In step 206, the mixer's upper door opens. In step 206, the guillotine opens letting flour into the mixing compartment. Next, in step 261 the sifter actuates and sifts flour filling a measure cup for the next cycle. Next, water is added and the mixer blades rotate thereby mixing the flour into dough until dough is formed (step 207).

The mixer and pestle group 110, includes the dough forming for forming dough out of the ingredients. In step 270 and 271, the bottom press moves forward from the pre-form position and the bottom press pushes the hopper up in preparation to receive the dough. Next, in step 208 mixer's lower door opens and the blades rotate counter-clockwise so that the dough is extracted from into the hopper to create the pre-form (step 209). Next, the lower press and hopper move downward, and the mixer assembly moves into pre-form position 210. Next (in step 211), the dough is pre-formed by the pestle moving downward pushing the dough out of the hopper.

The press group 115 includes the forming means for pressing dough to form a pie crust, presses the dough forming the pie crust. Next in step 212, the lower press moves into the press position (directly under the top press). Next in step 213 the dough is pressed to create pie crust. Next in step 215 the lower press moves to the forward position lifting the pie crust and causing the pie crust to fall into arm that moves the pie crust through the machine along the x axis, y axis and z axis. The arm or a dynamic robotic arm moves the pie crust in the x axis, y axis and z axis directions through the vending machine between pie crust forming means, below the sauce dispenser, the oven, box forming means, receiving tray zone and final dispensing area, and for moving the carrying device between a box forming means drop zone and the pizza receiving tray zone and final dispensing area. Additionally, the top press and lower press may each be at different temperatures resulting in a temperature difference that allows the curst to easily fall off the presses. Also, in step 217, the bottom press moves to the start position ready for the pre-formed dough. Next, in 217 the arm moves the pie crust to the sauce dispensing means. The sauce dispensing means for dispensing sauce on the pie crust includes a rotating sauce dispenser. Next in step 218, the tomato dispenser rotates and translates either inward or outwards and pumps sauce out of the nozzle to dispense sauce on to the crust. Next the arm over the crust with sauce so that it may receive the toppings.

The refrigeration group 110 includes a refrigeration group for refrigeration of toppings and sauce. The refrigeration group houses a topping dispensing apparatus 130 for dispensing topping on the pizza as the arm moves with the pie crust on the arm in the area 125 below the refrigeration group (step 219). The refrigeration group opens and, depending on the toppings selected, the appropriate topping apparatus actuates dispensing onto the pie crust as the pie crust moves through below the refrigeration group.

The oven group 135 includes a cooking means for cooking the toppings and pie crust. The arm moves the pizza to the oven's rotating tray in step 221. The processor actuates the rotating element to rotate the oven's rotating tray while the pizza is cooked inside the oven for the appropriate time (step 230). Next the arm picks up the cooked pizza and locates it in the trap dispenser compartment over the pizza pox (step 233).

The boxer machine group 140 includes a package forming means for forming a carrying device such as a box or try to hold the pizza. Next, in step 222, the arm locates itself under the boxing machine drop zone so that it can receive a formed box or tray. Next in step 223, the boxer machine folds and drops the pizza box onto the arm and then the pizza pox is set down on the tray dispenser. Additionally, the boxer machine picks up the next box and gets ready for the next cycle (step 225).

The outfeed group 150 includes an area where the cooked pizza in the tray may be dispensed. In step 233 the arm picks up the cooked pizza and locates it in the tray dispenser compartment over the pizza box. Next, the arm moves backward such that a portion of the pizza contacts a notch causing the pizza to drop into the tray as the arm moves backwards. Next in step 235, the door to the final dispensing area opens so that the user can remove the pizza.

The machine also includes a box dispensing device for dispensing boxes or packages of condiments, spices, sauces, cheeses etc. The box, container dispensing device is further explained below in FIGS. 6 and 7.

The sifting device may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, Makrolon™, polymeric materials such as plastic, polyvinyl chloride (PVC) plastic, vinyl, and silicone. The sifting device may be formed from a single piece or from several individual pieces joined or coupled together. The components of the sifting device may be manufactured from a variety of different processes including an extrusion process, a mold, welding, shearing, punching welding, folding, etc.

The parts of the sifting device can be connected by fasteners. Each of the fasteners may include a suction cup, hooks, bolt, set crews, opening configured to attached to protruding element, socket screws u-bolts, twine, etc. However, other types of fasteners may also be used and are within the spirit and scope of the present invention. Other methods may be used including adhesives or using tighter tolerance and pressure to hold the parts together. The adhesive may be a pressure sensitive adhesive comprising materials such as comprise lanolin, mineral oil, petrolatum, rosin, silicone, and zinc oxide. The backing may be made of material, such as wax paper or other materials used to protect adhesive materials.

Figure 6:
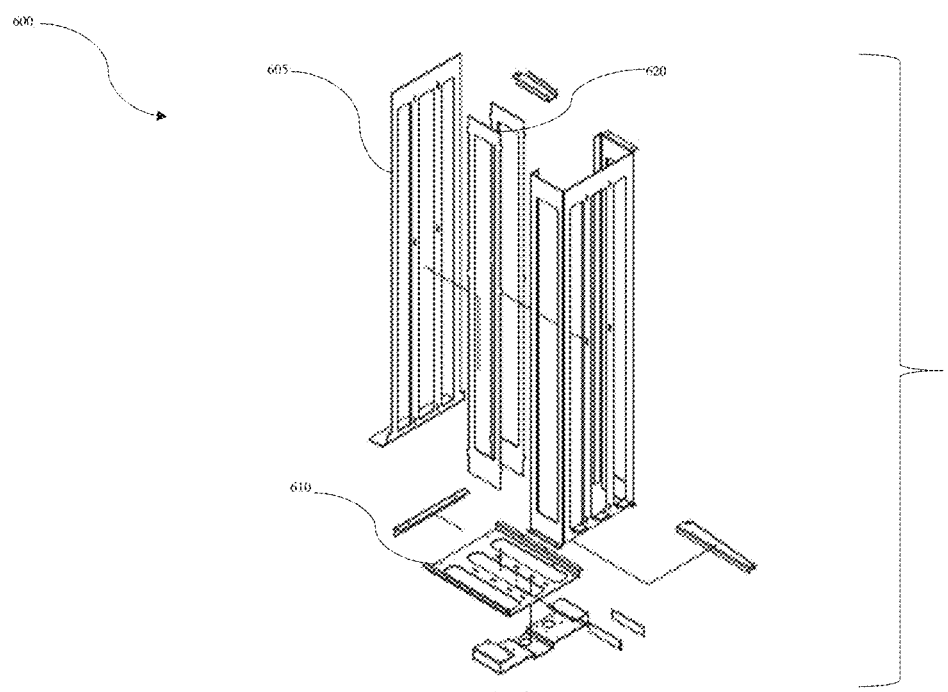
FIG. 6 is an exploded perspective view of an illustration of the box dispenser, according to an example embodiment.
Figures 7A, 7B:
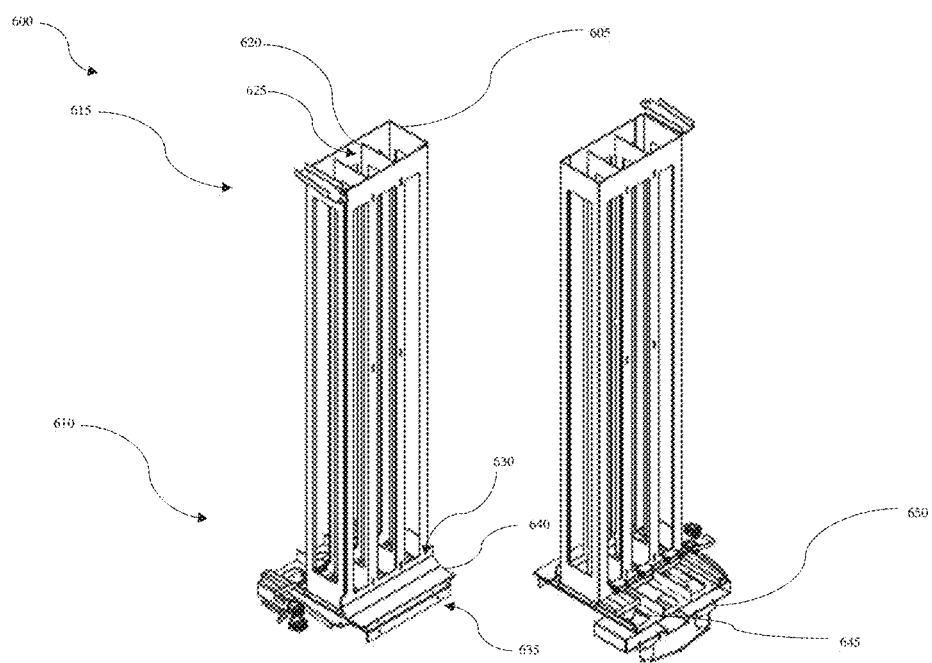
FIG. 7A is a perspective view of an illustration of the box dispenser, according to an example embodiment.
FIG. 7B is a perspective view of an illustration of the box dispenser, according to an example embodiment.
Figure 8:
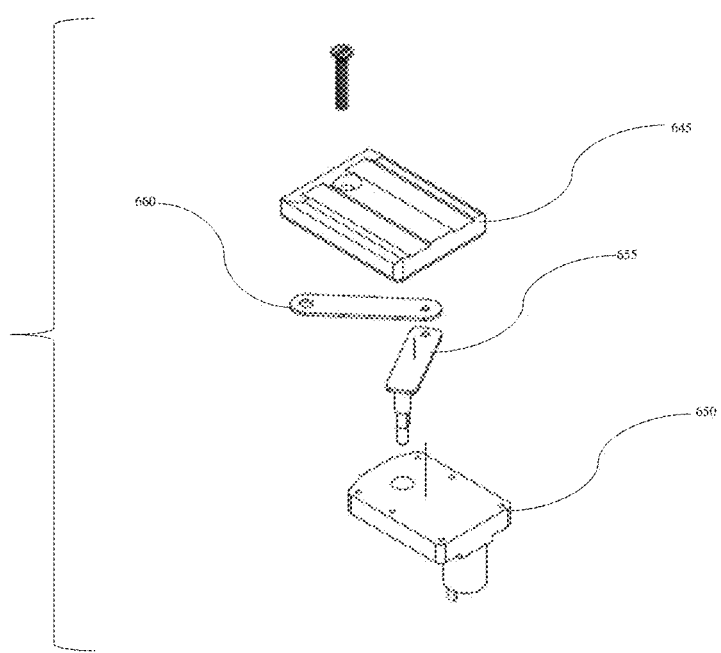
FIG. 8 is an exploded perspective view of an illustration of the box motor, crank and connecting rod of the box move, according to an example embodiment.

FIGS. 6-8 depict an object dispensing device 600. The object dispensing device includes a vertical rack 605, which has a closed bottom end 610 and an open top end 615. The top end is for receiving boxes. The object dispensing device includes at least one vertical orientated spacer 620 defining a plurality of vertical compartments 625. Each vertical compartment is for housing a vertical stack of objects. The object dispensing device includes an opening 630 at a front side 635 of the lower end of each vertical compartment for allowing objects to be dispensed out of the front side of the of the rack. The object dispensing device includes a sensor 640 at the lower end of each vertical compartment for detecting objects.

The vertical rack 605 is rectangular in shape and hollow so that it can receive the objects. The bottom end 610 is closed so that the objects can sit at the bottom end until they are ready to be dispensed. The top end 615 is open in order to receive objects. The vertical rack can be a shape other than rectangular depending on the size and shape of the objects that the object dispensing device is dispensing.

The vertical oriented spacer 620 is rectangular in shape and is placed within the vertical rack so that it divides the vertical rack into separate vertical compartments 625. The shape and height of the vertical oriented spacer is similar to the shape and height of the vertical rack, so that the vertical rack is subdivided properly. Each vertical compartment will house a different stack of objects. In the embodiment described, each vertical stack of objects would represent a different topping that the user could choose from.

The opening 630 at the front end 635 of the lower end of each vertical compartment is rectangular in shape and matches the size of the objects being dispensed. The opening allows the objects to exit the vertical rack after that object is paid for and selected by the user. The opening is sized and shaped based on the size of the objects being dispensed.

The sensor 640 at the lower end of the vertical compartment detects when there are objects present. In the preferred embodiment, there is a separate sensor for each vertical stack of objects within the object dispensing device. The sensor may be optical, mechanical, pressure sensitive or any sensor that can detect whether an object is present. The sensor will be used with a control system (described later) to notify the owner or operator of the machine when the objects need to be refilled and notify the user that an object is unavailable for purchase.

The object dispensing device includes a box mover 645 at the lower end of each vertical compartment. The box mover is configured to translate forwards and backwards in the rack so that the box mover pushes the lowest object in the vertical stack out of the opening 630 of each compartment. The object dispensing device includes a motor 650 providing rotational force. A crank 655 and connecting rod 660 are coupled to the motor 650 and the box mover 645. The crank and connecting rod convert the rotational force provided by the motor to linear force so the box mover can translate frontwards and backwards in the rack.

The box mover 645 is rectangular in shape and pushes the objects forward through the opening so that the objects can be dispensed to the customer. The box mover can be any shape that is able to move the objects forward. The box mover is sized and shaped relative to the size and shape of the objects that the box mover dispenses through the opening so that the box mover can move one object through the opening at a time. In the preferred embodiment, there is a separate box mover for each vertical stack of objects.

The motor 650 is an electric motor, which is controlled by the control system (described later) in order to move the box mover. The size of the electric motor is dependent on the size of the objects that are to be dispensed. The crank 655 and connecting rod 660 are attached to the motor so that the crank and connecting rod can translate the rotational force of the motor 650 into a linear force so that the box mover can operate. In the embodiment shown, the motor, crank, connecting rod and box dispenser are connected by fasteners, but may be connected by other means. For each box mover, there is a separate motor, crank and connecting rod system, so that one object can moved through the opening 630 at a time. The motor(s) are controlled by the control system (described later), which allows the user to select the object to be dispensed.

The object dispensing device operates by placing vertical stacks of objects into their respective vertical compartments 625, which are defined by the spacer 620 and the rack 605. The vertical stacks of objects are placed in the top end 615 and sit on bottom end 610. In the preferred embodiment, the vertical stacks of objects are a vertical stack of hermetically sealed boxes that contain toppings or condiments. Each vertical stack of objects is a different topping. Thus, the object dispensing device dispenses toppings for the user to put on their food after they pay for the respective topping(s).

In order to operate the device, the user then places money into the control system (described later) and selects the object that the user desires to purchase. Once the object is purchased and selected, the control system then engages the motor 650 associated with that object, which engages the respective crank 655 and connecting rod 660, which translates force into the respective box mover 645. The box mover then pushes the object that the user selected from the bottom of the respective vertical stack of objects out of the opening 630. The user then takes the dispensed object for their personal use.

When there are no objects left in a specific vertical stack of objects, the control system (described later) through the sensor 640 senses the lack of those objects and notifies the machine owner or operator or user that the respective object is not available and needs to be refilled. When the vertical stack of objects is refilled, the sensor no longer senses the lack of objects and the notification through the control system is turned off.

The object dispensing device may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, Makrolon™, polymeric materials such as plastic, polyvinyl chloride (PVC) plastic, vinyl, and silicone. The object dispensing device may be formed from a single piece or from several individual pieces joined or coupled together. The components of the object dispensing device may be manufactured from a variety of different processes including an extrusion process, a mold, welding, shearing, punching welding, folding, etc.

The parts of the object dispensing device can be connected by fasteners. Each of the fasteners may include a suction cup, hooks, bolt, set crews, opening configured to attached to protruding element, socket screws u-bolts, twine, etc. However, other types of fasteners may also be used and are within the spirit and scope of the present invention. Other methods may be used including adhesives or using tighter tolerance and pressure to hold the parts together. The adhesive may be a pressure sensitive adhesive comprising materials such as comprise lanolin, mineral oil, petrolatum, rosin, silicone, and zinc oxide. The backing may be made of material, such as wax paper or other materials used to protect adhesive materials.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A sifting device comprising:
a main body having an upper end, a lower end, an upper chamber at the upper end and a lower chamber at the lower end;
the upper chamber having a side wall, an end wall and a mouth;

an upper chamber central opening on the end wall of the upper chamber, wherein the upper chamber central opening is concentric with the upper chamber;

an upper chamber offset opening on the end wall of the upper chamber, wherein the upper chamber offset opening is offset from a central axis of the upper chamber;

a rotatable shaft that rotates about the central axis of the upper chamber and that is disposed in the upper chamber central opening;

a blade disposed just above the end wall and in attachment with the rotatable shaft such that the blade rotates when the rotatable shaft rotates;

the blade is configured to rotate between an open position and a closed position, wherein in the open position the blade does not cover the upper chamber offset opening, and wherein in the closed position the blade covers the upper chamber offset opening;

a cone element disposed on the blade and concentric with the upper chamber;

a lower sifting element disposed within the lower chamber;

the lower sifting element defining a plurality of radially extending teeth and a lower sifting element central opening that is concentric with the lower chamber, wherein the rotatable shaft is disposed within the lower sifting element central opening and is in attachment with the lower sifting element such that the lower sifting element rotates below the upper chamber when the rotatable shaft rotates; and, the upper chamber offset opening configured to allow powdered substance to move from the upper chamber to the lower chamber.

2. The sifting device from claim 1, wherein the sifting device further comprises a protruding body extending inward from the side wall of the upper chamber above the blade, the protruding body for agitating the powdered substance in the upper chamber.

3. The sifting device from claim 1, wherein the sifting device further includes a cartridge that is removable attachable with the upper chamber.

4. The sifting device of claim 1, wherein the lower sifting element is disposed within a lower sifting element housing, wherein the lower sifting element housing has a lower sifting element housing upper opening on an upper side, a lower sifting element lower opening on a lower side offset from the lower sifting element housing upper opening, and a lower sifting element housing central opening that is concentric with the lower chamber and having the rotatable shaft disposed therein.

5. The sifting device of claim 4, wherein a tubular shaped conduit spans from the upper chamber offset opening to the lower sifting element housing upper opening defining a channel from the upper chamber to inside the lower sifting element housing.

6. The sifting device of claim 1, wherein a base of the cone element defines a first area that is less than a second area defined by the blade.

7. The sifting device of claim 1, wherein an apexed bulb is disposed on a point of the cone element.

8. A sifting device comprising:
a main body having an upper end, a lower end, and an upper chamber at the upper end;

the upper chamber having a side wall, an end wall and a mouth;

an upper chamber central opening on the end wall of the upper chamber, wherein the upper chamber central opening is concentric with the upper chamber;

an upper chamber offset opening on the end wall, wherein the upper chamber offset opening is offset from a central axis of the upper chamber;

a rotatable shaft that rotates about the central axis of the upper chamber and that is disponed in the upper chamber central opening;

an upper sifting element in attachment with the rotatable shaft such that the upper sifting element rotates when the rotatable shaft rotates;

the upper sifting is element configured to move between an open position and a closed position, wherein in the open position the upper sifting element does not cover the upper chamber offset opening, and wherein in the closed position the upper sifting element covers the upper chamber offset opening;

a lower sifting element disposed below the upper chamber;

the lower sifting element defining a plurality of radially extending teeth and a lower sifting element central opening concentric with the lower sifting element, wherein the rotatable shaft is disposed within the lower sifting element central opening and in attachment with the lower sifting element such that the lower sifting element rotates when the rotatable shaft rotates; and, wherein the upper chamber offset opening is configured to allow the powdered substance to move from the upper chamber to the lower sifting element.

9. The sifting device from claim 8, wherein the sifting device further comprises a protruding body extending inward from the side wall of the upper chamber above the upper sifting element, the protruding body for facilitating sifting of the powdered substance in the upper chamber.

10. The sifting device from claim 8, wherein the sifting device further includes a cartridge that is removable attachable with the upper chamber.

11. The sifting device of claim 8, wherein the lower sifting element is disposed within a lower sifting element housing, wherein the lower sifting element housing has a lower sifting element housing upper opening on an upper side, a lower sifting element lower opening on the lower side offset from the lower sifting element housing upper opening, and a lower sifting element housing central opening that is concentric with the lower sifting element and configured to have the rotatable shaft therein.

12. The sifting device of claim 11, wherein a tubular shaped conduit spans from the upper chamber offset opening to the lower sifting element housing upper opening defining a channel from the upper chamber to inside the lower sifting element housing.

13. The sifting device of claim 1, wherein a base of the cone element defines a first area that is less than a second area defined by an upper sifting element.

14. The sifting device of claim 1, wherein an apexed bulb is disposed on a point of the cone element.

* * * * *